US010595353B2

(12) United States Patent
Rosa et al.

(10) Patent No.: US 10,595,353 B2
(45) Date of Patent: Mar. 17, 2020

(54) IMPROVING COMMUNICATION EFFICIENCY

(71) Applicant: Nokia Solutions and Networks Oy, Espoo (FI)

(72) Inventors: Claudio Rosa, Randers NV (DK); Jeroen Wigard, Klarup (DK); Benoist Pierre Sebire, Tokyo (JP); Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 93 days.

(21) Appl. No.: 15/542,788

(22) PCT Filed: Jan. 12, 2015

(86) PCT No.: PCT/EP2015/050408
§ 371 (c)(1),
(2) Date: Jul. 11, 2017

(87) PCT Pub. No.: WO2016/112949
PCT Pub. Date: Jul. 21, 2016

(65) Prior Publication Data
US 2018/0007569 A1 Jan. 4, 2018

(51) Int. Cl.
*H04W 76/15* (2018.01)
*H04L 12/801* (2013.01)
(Continued)

(52) U.S. Cl.
CPC ............ *H04W 76/15* (2018.02); *H04L 47/12* (2013.01); *H04L 47/30* (2013.01); *H04L 47/34* (2013.01);
(Continued)

(58) Field of Classification Search
CPC ......... H04L 47/12; H04L 47/30; H04L 47/34; H04L 47/36; H04W 24/02;
(Continued)

(56) References Cited

U.S. PATENT DOCUMENTS

2007/0189304 A1* 8/2007 Rosa ................... H04L 1/0007
370/395.21
2015/0085800 A1* 3/2015 Sivanesan ............ H04L 5/0055
370/329
(Continued)

FOREIGN PATENT DOCUMENTS

WO 2014161168 A1 10/2014

OTHER PUBLICATIONS

Stevens, W. Richard, RFC 2001: "TCP slow start, congestion avoidance, fast retransmit, and fast recovery algorithms," 1997, pp. 1-2. (Year: 1997).*

(Continued)

*Primary Examiner* — Kyaw Z Soe
(74) *Attorney, Agent, or Firm* — Brake Hughes Bellermann LLP

(57) ABSTRACT

There is provided a method comprising: preparing a data packet for transmission on a bearer, wherein at least one of the following is configured for transmission: a first network node and a second network node, checking whether at least one predetermined criterion is met, selecting, based at least partly on the said checking, whether to transmit the data packet via the first network node, via the second network node, or via both the first and the second network nodes, and transmitting the data packet according to the selecting.

19 Claims, 5 Drawing Sheets

(51) Int. Cl.
  *H04L 12/805* (2013.01)
  *H04L 12/835* (2013.01)
  *H04W 28/02* (2009.01)
  *H04W 28/08* (2009.01)
  *H04W 24/02* (2009.01)
  *H04W 40/12* (2009.01)

(52) U.S. Cl.
  CPC ............ *H04L 47/36* (2013.01); *H04W 24/02* (2013.01); *H04W 28/0236* (2013.01); *H04W 28/0263* (2013.01); *H04W 28/08* (2013.01); *H04W 40/12* (2013.01)

(58) Field of Classification Search
  CPC . H04W 28/0263; H04W 28/08; H04W 40/12; H04W 76/025; H04W 76/15; H04W 72/1252; H04W 28/0278; H04W 28/085; H04W 16/32; H04W 72/0413
  See application file for complete search history.

(56) References Cited

U.S. PATENT DOCUMENTS

| | | | |
|---|---|---|---|
| 2015/0173120 A1* | 6/2015 | Yamada | H04W 36/0072 370/331 |
| 2016/0057585 A1* | 2/2016 | Horn | H04W 80/02 370/312 |
| 2016/0057687 A1* | 2/2016 | Horn | H04W 24/10 370/331 |
| 2016/0119939 A1* | 4/2016 | Himayat | H04W 28/0278 370/329 |
| 2016/0227433 A1* | 8/2016 | Lee | H04W 72/1242 |

OTHER PUBLICATIONS

International Search Report and Written Opinion received for corresponding Patent Cooperation Treaty Application No. PCT/EP2015/050408, dated Sep. 17, 2015, 12 pages.

Jha Satish et al: "Dual Connectivity in LTE Small Cell Networks", 2014 IEEE Globecom Workshops, IEEE, Dec. 8, 2014 pp. 1205-1210 XP032747851.

Etri: "Trade-off between benefits and drawbacks on three architectures", 3GPP Draft; R2-132595, 3rd Generation Partnership Project (3GPP), Mobile Competence Centre ; 650, Route Des Lucioles ; F-06921 Sophia-Antipolis Cedex ; France, [Online] vol. RAN WG2, No. Barcelona, Spain; 20130819-20130823, Aug. 9, 2013 (Aug. 9, 2013), pp. 1-5, XP050718252.

NTT Docomo et al: "Threshold based splitting for UL bearer split", 3GPP Draft; R2-141713_Thresh0ld Based Splitting for UL Bearer Split, 3rd Generation Partnership Project (3GPP), Mobile Competence Centre ; 650, Route Des Lucioles ; F-06921 Sophia-Antipolis Cedex ; France, [Online] vol. RAN WG2, No. Valencia, Spain; 20140331-20140404, Mar. 22, 2014 (Mar. 22, 2014), pp. 1-4, XP050817932.

First Office Action for Chinese Patent Application No. 201580060714.4, dated Oct. 12, 2019, 6 pages.

* cited by examiner

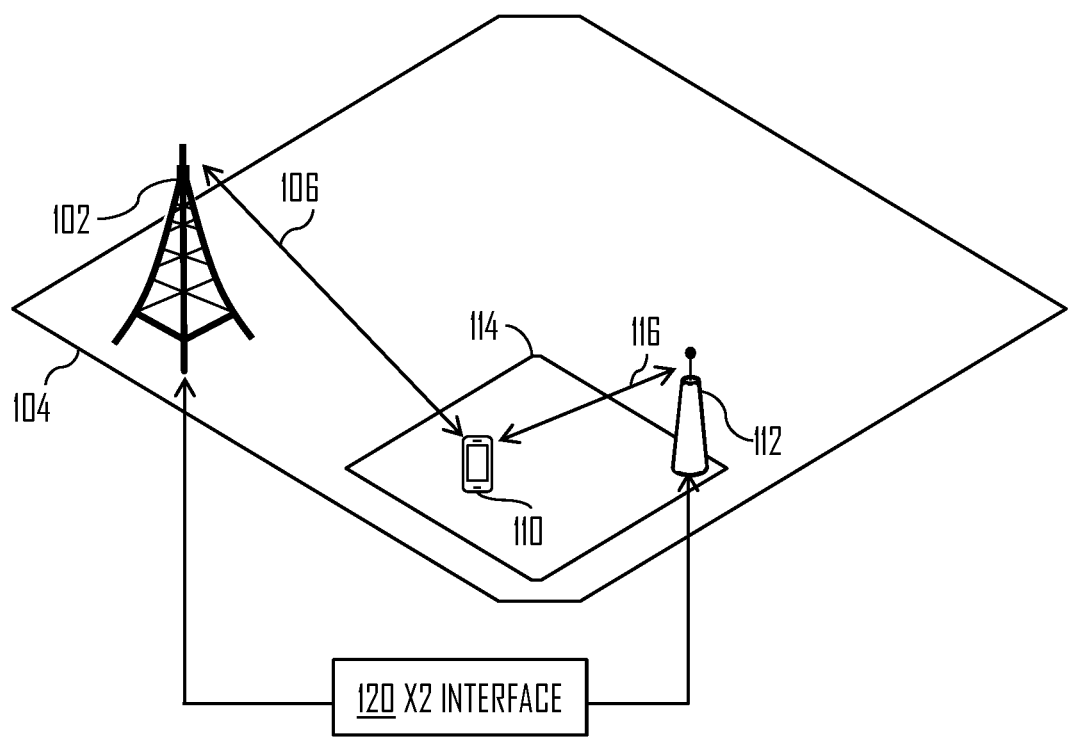

Fig. 1

210 PREPARING A DATA PACKET FOR TRANSMISSION ON A BEARER, WHEREIN AT LEAST ONE OF THE FOLLOWING IS CONFIGURED FOR TRANSMISSION: A FIRST NETWORK NODE AND A SECOND NETWORK NODE

220 CHECKING WHETHER AT LEAST ONE PREDETERMINED CRITERION IS MET

230 SELECTING WHETHER TO TRANSMIT THE DATA PACKET VIA THE FIRST NETWORK NODE, VIA THE SECOND NETWORK NODE, OR VIA BOTH THE FIRST AND THE SECOND NETWORK NODES

240 TRANSMITTING THE DATA PACKET ACCORDING TO THE SELECTING

Fig. 2

IMPROVING COMMUNICATION EFFICIENCY

RELATED APPLICATION

This application was originally filed as PCT Application No. PCT/EP2015/050408 filed Jan. 12, 2015.

TECHNICAL FIELD

The invention relates to communications.

BACKGROUND

In a radio communication network data may be transmitted by and received from multiple sources using different transmission modes. Enhancing the using of different transmission modes in different situations may be beneficial for performance of the radio communication network.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which FIG. 1 illustrates an example a radio system to which embodiments of the invention may be applied;

FIG. 2 illustrates a block diagram according to an embodiment of the invention;

DETAILED DESCRIPTION OF SOME EMBODIMENTS

Figure 3:
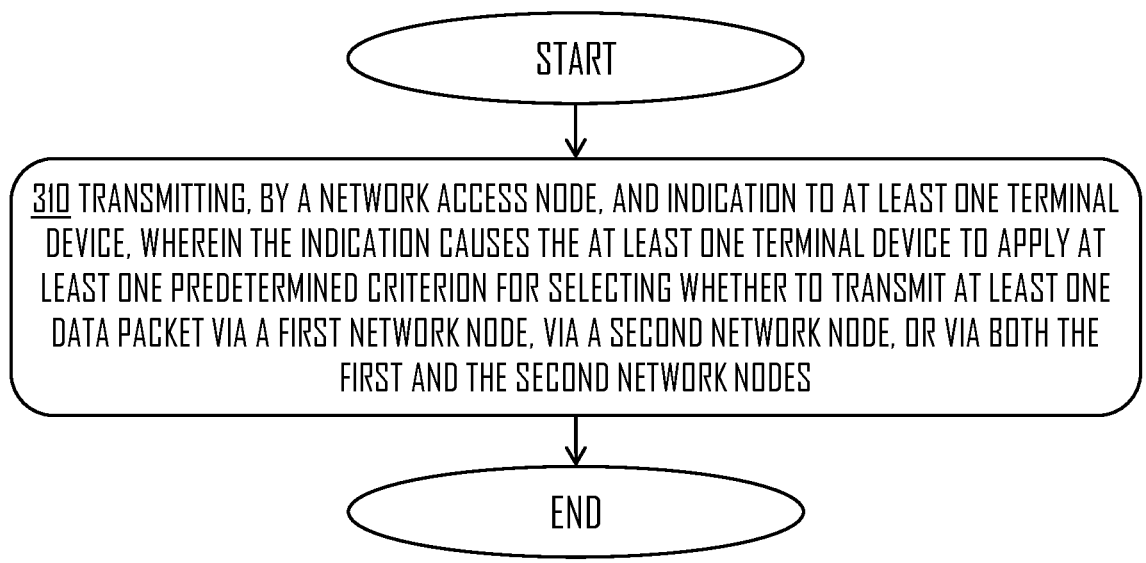
FIG. 3 illustrates a block diagram according to an embodiment of the invention.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

FIG. 1 shows an example of a radio system to which embodiments of the invention may be applied. Radio communication networks, such as the Long Term Evolution (LTE) or the LTE-Advanced (LTE-A) of the $3^{rd}$ Generation Partnership Project (3GPP), are typically composed of at least one network element, such as a network element 102, providing a cell 104. Each cell may be, e.g., a macro cell, a micro cell, or a pico-cell, for example. Thus, the radio communication network may be a heterogeneous network (HetNet). The network element 102 may be a network node, an evolved node B (eNB) as in the LTE and LTE-A, a radio network controller (RNC) as in the UMTS, a base station controller (BSC) as in the GSM/GERAN, or any other apparatus capable of controlling radio communication and managing radio resources within a cell. The network element 102 may be a base station or a small base station, for example. In the case of multiple eNBs in the communication network, the eNBs may be connected to each other with an X2 interface 120 as specified in the LTE. Other communication methods between the network elements may be possible.

The network element 102 may control a cellular radio communication link 106 established between the network element 102 and at least one terminal device 110 located within or comprised in the cell 104. The communication link 106 may be referred to as conventional communication link for end-to-end communication, where the source device transmits data to the destination device via the network element 102 and/or core network.

The radio system may comprise a second network element 112. The second network element 112 may be similar to the network element 102, such as an eNB. For example, the second network element 112 may be a small network element 112, such as a small base station, used to increase performance of the radio communication network in certain areas. Thus, a cell 114 may be, e.g., a macro cell, a micro cell, or a pico-cell, for example. However, for simplicity, let us in the following assume that the second network element 112 is a small network element 112.

The small cell 114 provided by the small network element 112 may at least partly be within and/or comprised in the cell 104. The small cell 114 may be within multiple cells provided by network element(s), in a case where the radio communication network may comprise more network element(s), such as the network element 102 and/or the small network element 112. The small network element 112, the network element 102 and other network element(s) may be connected over the X2 interface 120 providing communication link between network elements, such as the network elements 102, 112.

In an embodiment, the small cell 114 is located at least partly outside the cell 104. The small cell 114 may be, for example, adjacent to the cell 104. In such case, the cells 104, 114 may at least partly overlap each other.

The small network element 112 may control a cellular radio communication link 116 established between the small network element 112 and at least one terminal device 110 located within and/or comprised in the cell 114, as was the case with the communication link 106.

The network element 102 and the small network element 112 may further be connected via an S1 interface to an evolved packet core (EPC), more specifically to a mobility management entity (MME) and to a system architecture evolution gateway (SAE-GW).

The at least one terminal device 110 may be simultaneously within multiple cells provided by network elements, such as the cells 104, 114. The serving network element may be selected by various criteria, such as received power, signal to noise ratio (SNR) and path loss, to name a few. The at least one terminal device 110 may be a terminal device of a radio system, e.g. a computer (PC), a laptop, a palm computer, a mobile phone, a tablet, a phablet or any other user terminal or user equipment capable of communicating with the radio communication network.

In an embodiment, the at least one terminal device 110 is able to communicate with other similar devices via the network element 102. The other devices may be within the cell 104 and/or may be within other cells provided by other network elements. The at least one terminal device 110 may be stationary or on the move. In an embodiment, the at least one terminal device 110 may communicate directly with other terminal devices using, for example, Device-to-Device (D2D) communication.

The radio system may support Dual Connectivity (DC). This may be enabled by the network elements 102, 112, and/or other network elements within the radio system. Naturally, in order to use DC, the at least one terminal device 110 may also need to support DC. The DC may be a radio system feature, wherein the at least one terminal device 110 may simultaneously receive data from at least two network points, such as the network elements 102, 112. Similarly, the at least one terminal device 110 may be able to transmit data simultaneously to more than one network element 102, 112. Thus, the small network element 112 and the network element 102 may be able to transmit and/or receive data simultaneously to the at least one terminal device 110.

In DC, it may be possible to use at least three different bearers: a Master Cell Group (MCG) bearer, a Secondary Cell Group (SCG) bearer and a split bearer. The MCG may be a cell group associated with a Master eNB (MeNB) and the SCG may be a cell group associated with a Secondary eNB (SeNB). The MeNB may be and/or comprise the network element 102. The SeNB may be and/or comprise the small network element 112. Therefore, the cell 104 may be comprised in the MCG and the small cell 114 may be comprised in the SCG. The network elements 102, 112 may provide more than one cell which may be comprised in the MCG and/or SCG. The MCG and the SCG may comprise more than one cell provided by network element 102, 112 and/or other network element(s).

In an embodiment, the MCG includes the cell 104 and the SCG includes the small cell 114. In another embodiment, the MCG includes the cell 114 and the SCG includes the small cell 104. For simplicity, let us in the following assume the former embodiment.

When split bearer(s) is used, the network element 102 acting as a master network element, such as a MeNB, may control the downlink terminal device data delivery, with the small network element 112 acting as a secondary network element, such as a SeNB. Therefore, the network element 102 may transmit, for example, different data packets directly to the at least one terminal device 110, and simultaneously request the small network element 112 to transmit other data packets to the at least one terminal device 110. The data packets and control information related to the transmitting may be transferred between the network elements 102, 112 using the X2 interface 120, for example.

Similarly, to the using of downlink split bearer(s), the at least one terminal device 110 may transmit data in uplink direction, wherein the at least one terminal device 110 may transmit some data packets to the network element 102 and other data packets to the small network element 112, for example.

The radio system may be configured to support Internet protocol suite often referred as Transmission Control Protocol (TCP)/Internet Protocol (IP). More particularly, the radio system may be configured to support TCP traffic. Therefore, the radio system may support TCP and DC for transferring data.

The TCP traffic may be characterized by a slow-start phase, which is a well-known congestion control strategy used by TCP. During slow-start phase, the performance of the radio communication network may mainly be impacted by latency rather than bandwidth. This may be due to the fact that during the slow-start phase network congestion may be avoided by avoiding transmitting more data than the radio communication network is able to transmit and/or receive.

For example, in case of a multi-path transmission, wherein data may be transmitted by one or more transmitters and/or received by one or more receivers, it may be beneficial to deliver the data via a path that may have lower latency and/or delay. In DC, whether the latency is lower when transmitting data via the MeNB or the SeNB may depend on a number of factors, such as the load in the MeNB and/or the SeNB and the non-ideal X2-interface 120 latency, to name a few. While the MeNB may try to estimate the latency that the transmitted data would experience when the data is transmitted via the SeNB, and compare it to the expected delay if transmitting the same data directly by the MeNB, such estimation might not always be accurate. This may be the case, for example, at the beginning of a packet data session or the TCP slow start phase.

Thus, reducing the latency, i.e. in what time a data packet transmitted from the transmitter is received by the receiver, may become beneficial for the performance of the radio communication network. Reduced latency may also be beneficial after and/or before the slow-start phase of the TCP traffic, and moreover the reduced latency may be beneficial with other type of radio communication network traffic too. In an embodiment, the radio communication network is referred as a network.

There is provided a solution for enhancing the performance of the radio communication network. Let us now take a look at the solution by looking at the embodiment of FIG. 2. Referring to FIG. 2, in step 210, a data packet may be prepared for transmission on a bearer, wherein at least one of the following may be configured for transmission: a first network node and a second network node. The first network node may be and/or comprised in the network element 102 and the second network node may be and/or comprised in the small network element 112, or vice versa, for example.

In step 220, it may be checked whether at least one predetermined criterion is met. The at least one predetermined criterion may comprise one or more criteria which are discussed later in more detail. Based at least partly on the checking of step 220, it may be selected, in step 230, whether to transmit the data packet via the first network node, via the second network node, or via both the first and the second network nodes. Thus, the at least one predetermined criterion may have an effect on which of the transmission path(s) is selected. In step 240, the data packet may be transmitted according to the selecting of step 230.

In an embodiment, an eNB is configured to perform the steps from 210 to 240 of FIG. 2. In such case, the eNB may be and/or be comprised in the network element 102, for example. In an embodiment, the eNB comprises the first network node and the network element 102. In another embodiment, a third network node performs the steps from 210 to 240 of FIG. 2. In such scenario, the third network node may use the first and/or the second network nodes to transfer information. The third network node may be connected to the first and/or the second network nodes via an Iub interface, for example. This may be the case, for example, if the third network node is an RNC and the first and the second network nodes are NodeBs (NBs).

In an embodiment, the at least one terminal device 110 is configured to perform the steps from 210 to 240 of FIG. 2. In such case, the at least one terminal device 110 may transmit data via the first and/or the second network nodes, as described in FIG. 2. The destination for the data transmission may be the first network node, the second network node and/or the third network node, for example.

In an embodiment, the bearer used for data transmission is transferred with two, at least partly disjoint routes, wherein a first route comprises the first network node and does not comprise the second network node, and wherein a second route comprises the second network node and not the first network node. Thus, the split bearer may be transmitted to the receiver via two separate routes and/or paths.

FIG. 3 illustrates a flow diagram according to an embodiment of the invention. Referring to FIG. 3, in step 310, a network access node may transmit an indication to the at least one terminal device 110, wherein the indication causes the at least one terminal device 110 to apply the at least one predetermined criterion for selecting whether to transmit at least one data packet via the first network node, via the second network node, or via both the first and the second network nodes. The network access node may be and/or be comprised in an eNB, the first network node and/or the second network node.

The indication may cause the at least one terminal device 110 to apply the at least one predetermined criterion by allowing the at least one terminal device 110 to apply the said at least one predetermined criterion. It may be equally possible that the indication causes the at least one terminal device 110 to apply the at least one predetermined criterion by commanding and/or forcing the at least one terminal device 110 to apply the said at least one predetermined criterion.

Figures 4A, 4B:
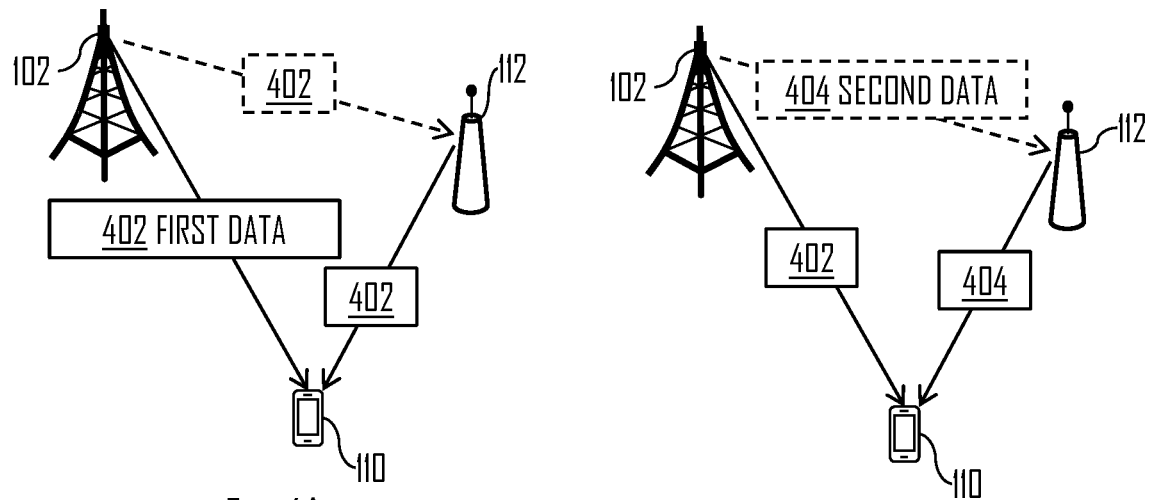
FIGS. 4A to 4B illustrate some embodiments of the invention.

FIGS. 4A to 4B illustrate some embodiments of the invention. Even though the FIGS. 4A to 4B illustrate embodiments, wherein the data is transmitted to downlink direction, uplink direction is equally possible. Thus, the at least one terminal device 110 may perform at least some of the described functions.

Referring to FIG. 4A, the data packet described in relation to FIG. 2 is now referred as a first data packet 402. The first data packet 402 may be transmitted to the at least one terminal device via the network element 102 and/or the small network element 112. The first data packet 402 may be transmitted by the network element 102, for example. Thus, the network element 102 may transmit the first data packet directly to the at least one terminal device 110 and/or indirectly via the small network element 112 to the at least one terminal device 110. It may also be possible that more than two paths are used for the transmission. Therefore, the first data packet 402 may be transmitted indirectly via some other network element to the at least one terminal device 110.

The at least one terminal device 110 may receive the first data packet from the network element 102 and/or the network element 112. As the same first data packet 402 may be transmitted more than one time by different network elements 102, 112, the same first data packet 402 may be received more than one time. The at least one terminal device 110 may use the first received first data packet 402 and discard other received first data packet after the first receiving. This way the latency of the transmission may be reduced. In an embodiment, transmitting the same data packet via both the network element 102 and the small network element 112 may be referred to as bicasting.

Referring to FIG. 4B, the network element 102 may prepare a second data packet 404 for transmission. The network element 102 may select, based at least partly on the at least one predetermined criterion, whether to transmit the first and the second data packets 402, 404 via the network element 102, via the small network element 112, or via both the network elements 102, 112, and transmit the data packets 402, 404 according to the selection. In FIG. 4B, it is shown that the data packets 402, 404 may be transmitted via different transmission paths. In an embodiment, this may be referred to as multicasting.

In an embodiment, the selecting comprises selecting, by for example the network element 102, to transmit the first and the second data packets 402, 404 via different network elements 102, 112, or to transmit the first and the second data packets 402, 404 via both the network element 102 and the small network element 112. In one embodiment the network node 102 may, based at least partly on the at least one predetermined criterion, decide to transmit a data packet to the at least one terminal device 110 only directly via the network element 102. In one embodiment the network node 102 may, based least partly on the at least one predetermined criterion, decide to transmit a data packet to the at least one terminal device 110 only indirectly via the second network element 112. These two latter options may be referred to as unicasting.

Let us now look closer on the at least one predetermined criterion described in step 220 of FIG. 2. The at least one predetermined criterion may be related to amount of data in a transmission data buffer of the network element 102, load in the network element 102, load in the small network element 112, size of the first and/or the second data packet, transmission delay via the small network element 112, priority of the first and/or the second data packet, and/or whether or not a timer is running.

The amount of data in the data buffer of the network element 102 may mean the amount of data in Packet Data Convergence Protocol (PDCP) buffer in the network element 102, wherein the PDCP buffer may comprise one or more PDCP Protocol Data Units (PDUs). For example, when the amount of data in the data buffer for the terminal device 110 starts to increase, the network element 102 may stop to transmit the data packets 402, 404 using the described bicasting, as bandwidth may become more important than the reduced latency achieved using the bicasting. Therefore, the at least one predetermined criterion may be used to select unicasting and/or multicasting as a transmission method for the data packet(s). On the other hand, if the amount of data in the data buffer is small or decreases, then the data may be bicasted.

In an embodiment, the first and the second data packets 402, 404 are PDUs. Similarly, other data packets described hereinafter may be PDUs.

The load in the network element 102 and/or in the small network element 112 may mean the network load in the corresponding network element 102, 112. Thus, the network load may comprise all the traffic that is being transferred through a specific network element, such as the network elements 102, 112, not only the data to the specific terminal device 110. For example, if the load in the network element 102 and/or the small network element 112 is generally low, the network may continue to bicast data packets via both network element 102 and the small network element 112 as far as there are spare resources in the network element 102 and the small network element 112 as compared to the amount of data in the network element's 102 data buffer. On the other hand, if the load is high, bicasting may be limited as much as possible in order to avoid waste of radio resources. In such case when the load is particularly high, the network and/or the network element 102 may only bicast data packets during the TCP slow-start phase, for example. For example, during high load, it may be beneficial to multicast the packets to decrease the load. However, if the other route via one of the eNBs 102, 112 is inefficient, only unicasting via the efficient route may be applied.

In an embodiment, the network element 102 receives, from the small network element 112, information about the load in the small network element 112. In the embodiment, the third network node may receive the information about the load in the small network element 112 from the small network element 112 and/or the network element 102.

Using the size of the first and/or the second data packet 402, 404 as a criterion may enable bicasting of packets smaller than a predetermined size threshold, such as Acknowledgements (ACKs), when they are not piggy-backed with reverse-direction data. Thus, the network and/or terminal device may bicast the ACKs even outside the TCP slow-start phase, for example. Therefore, it may be possible to unicast and/or multicast some data and change to bicasting for other data, based on the size of the data packet(s). On the other hand, packets that have higher size than the predetermined size threshold may be multi- or unicasted.

The transmission delay via the small network element 112 may be used to determine which transmission path may be the most efficient for a certain data packet. For example, if the first data packet is transmitted via X2 interface 120 from the network element 102 to the small network element 112, and then further transmitted by the small network element 112 to the at least one terminal device 110, the transmission delay may be higher compared to a direct transmission from the network element 102 to the at least one terminal device 110. However, in some cases the transmission delay may be smaller by the second network node. Further, in some cases the transmission delay may be higher, but the transmission may still be more efficient as there may be higher load in the network element 102, for example. Further, the transmission path may be selected, for example, for unicasting based on the transmission delay information. In other words, the data packet(s) may be unicasted via the transmission path that is characterized by the lower latency.

In an embodiment, the network element 102 receives, from the small network element 112, status report indicating the highest sequence number of a data packet that has been transmitted via the small network element 112, and based on the status report, determines the transmission delay via the small network element 112.

In an embodiment, the third network node receives, from the network element 102 and/or small network element 112, status report(s) indicating the sequence number of a data packet(s) that has been successfully transmitted via network element 102 and/or small network element 112, and based on the status report, determines the transmission delay via network element 102 and/or small network element 112. Thus, the third network node may be aware of the transmission path characterized by the lower latency.

Using the priority of the data packet(s) as a criterion may mean that the priority data packet(s) are bicasted to achieve the enhanced result even though otherwise the at least one predetermined criterion would suggest multicasting and/or unicasting. Therefore, if the network determines that some data packet has a priority level over a certain level, the network may, based on that determination, bicast the said data packet. In an embodiment, the high priority data packets are bicasted when the data buffer of the network element 102 is empty.

Whether or not a timer is running may be used as a criterion also. The timer may start, for example, when a Buffer Status Report (BSR) is triggered or when high priority data becomes available. The timer may run for a certain time, which may be configured by the network element 102, for example. In an embodiment, the timer is triggered to start when the TCP slow-start phase is started. In one embodiment, data is bicasted as long as the timer is running, and after the timer expires, the data is multicasted or unicasted (depending on the load situation, for example).

In an embodiment, an eNB, such as the network element 102, may transmit an indication, allowing to apply the at least one predetermined criterion, to the at least one terminal device 110. Therefore, the at least one terminal device 110 may be aware of the at least one predetermined criterion, and the indication may trigger the at least one terminal device 110 to apply the at least one predetermined criterion. In one embodiment, the predetermined one or more criteria are pre-stored in the terminal device 110. In another embodiment, the eNB 102 and/or the small network element 112 informs the terminal device 110 about the at least one predetermined criterion.

The indication to the terminal device 110 may comprise at least some configuration information, such as duration of the timer. In an embodiment, the duration of the timer is transmitted to the at least one terminal device 110 with a separate message. Said message and/or the indication may be transmitted using Radio Resource Control (RRC) signaling, for example.

Further, a specific PDCP control PDU may be used to control the bicasting operation. The network element 102 may transmit the described indication using the specific PDCP control PDU. Moreover, the specific PDCP control PDU may be used to trigger the at least one terminal device 110 to use the bicasting mode. For example, in relation to FIG. 3, the indication may comprise information that causes the at least terminal device 110 to select a wanted transmission mode and/or transmission path(s). In such case, the indication, and more particularly receiving the indication, may itself be comprised in the at least one predetermined criterion, and thus the whole operation may be actually controlled by the network element 102 and/or more broadly by the network.

In an embodiment, the at least one terminal device 110 may receive the indication allowing to apply the at least one predetermined criterion. The indication may be received from the network and/or the network element 102, for example. As described in relation to FIG. 3, the indication may cause the at least one terminal device 110 to apply the at least one predetermined criterion for selecting the transmission mode.

Figure 5:
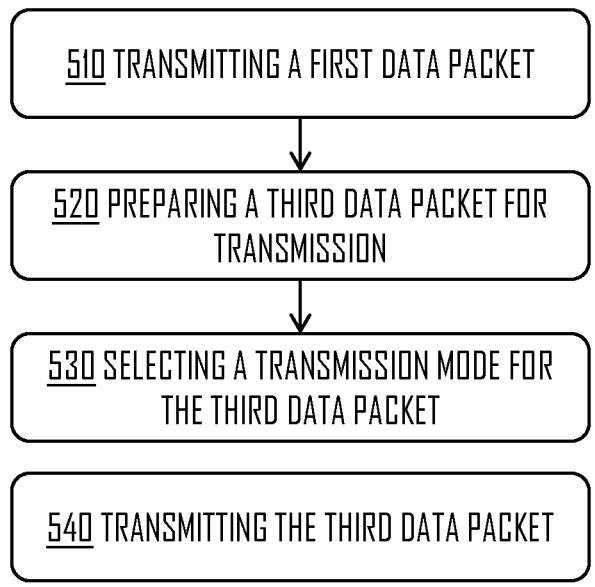
FIG. 5 illustrates a block diagram according to an embodiment of the invention.

FIG. 5 illustrates an embodiment of the invention. As discussed earlier in relation to FIGS. 4A to 4B, the embodiments described in relation to FIG. 5 may be applicable to both downlink and uplink data transmission. Thus, embodiments described here may be performed by the at least one terminal device 110 also.

Referring to FIG. 5, in step 510, the network element 102, for example, may transmit the first data packet via the network element 102 or via the small network element 112. In step 520, the network element 102 may further prepare a third data packet for transmission. In step 530, the network element 102 may select, based on that the third data packet is smaller than a predefined threshold, to transmit the third data packet via both the network element 102 and the small network element 112, and transmit the third data packet according to the selecting (step 540).

In an embodiment, the network element 102 transmits the second data packet via the network element 102 or via the small network element 112, wherein the first and the second data packets 402, 404 are transmitted via different network elements 102, 112.

In an embodiment, the at least one of the first and the second data packets 402, 404 are transmitted via both the network element 102 and the small network element 112. The transmitting may be performed, for example, by the network element 102 and/or the at least one terminal device 110.

Figure 6:
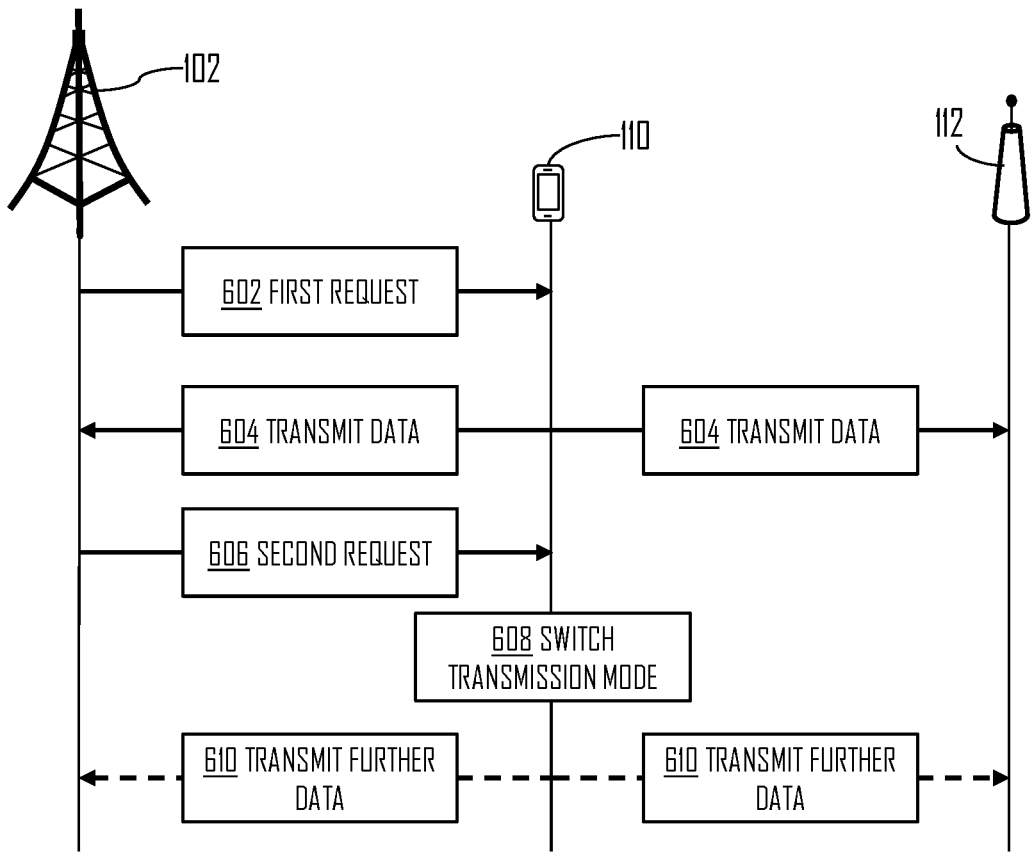
FIG. 6 illustrates a signal diagram according to an embodiment of the invention.

FIG. 6 illustrates transmission of data by the at least one terminal device 110 according to an embodiment of the invention. Referring to FIG. 6, the at least one terminal device 110 may receive, from the network element 102, a first request 602 to transmit data packet(s) to the network element 102, to the small network element 112 or to both the network element 102 and the small network element 112. That is to perform unicasting or bicasting. The at least one terminal device 110 may transmit the data packet(s) 604 according to the first request 602.

The at least one terminal device 110 may receive a second request 606, from the network element 102, to transmit further data packet(s) to the network element 102, to the small network element 112 or to both the network element 102 and the small network element 112, wherein each of the further data packet(s) is requested to be transmitted to only one network element 102, 112. Thus, the further data packet(s) are requested to be unicasted and/or multicasted. In step 608, the at least one terminal device 110 may switch the transmission mode and transmit the further data packet(s) 610 according to the second request 606.

In an embodiment, a network node, such as a terminal device and/or a network element, transmits data via both the network element 102 and the small network element 112, wherein the data transmitted via both the network element 102 and the small network element 112 is substantially identical. This may mean that the data packet(s) transmitted via both paths are duplicates of each other. That is, bicasting is applied. The said network node may then detect that the at least one predetermined criterion is met and select whether to transmit further data packet(s) via the network element 102, the small network element 112, or via both the network element 102 and the small network element 112, in which case the data packet(s) transmitted via different paths may comprise data that is different from each other. That is, the transmission mode is to be switched to unicasting or multicasting. The described embodiment may be applicable for TCP slow-start phase, for example.

In an embodiment, the data packet(s) are bicasted for a predetermined amount of TCP cycles each time a new TCP transmission starts. The timer, described above, may be used to determine the amount of cycles, and to change the transmission mode to unicasting and/or multicasting after the predetermined amount of cycles.

Figure 7:
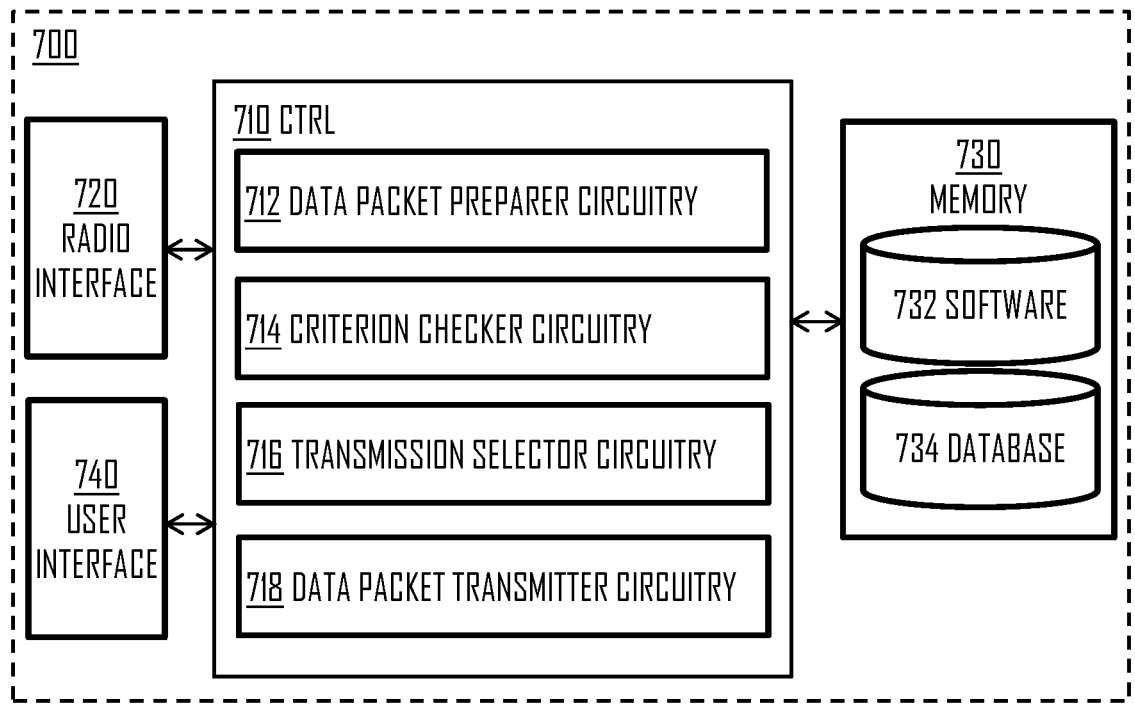
FIGS. 7 to 8 illustrate apparatuses according to some embodiments of the invention.
Figure 8:
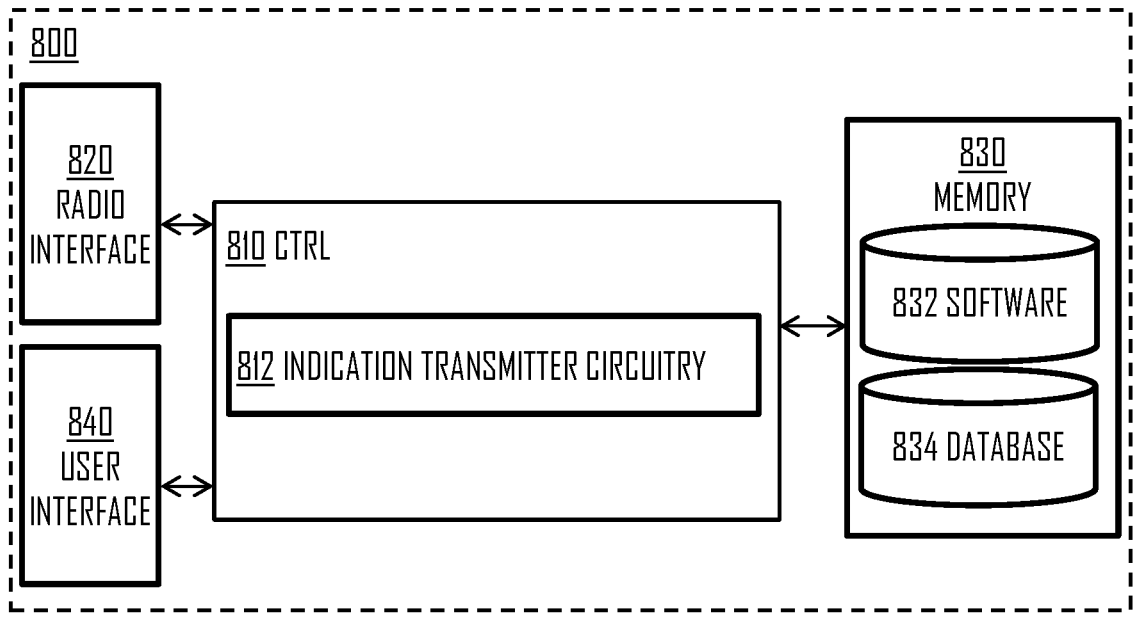

FIGS. 7 to 8 provide apparatuses 700, 800 comprising a control circuitry (CTRL) 710, 810, such as at least one processor, and at least one memory 730, 830 including a computer program code (software) 732, 832, wherein the at least one memory and the computer program code (software) 732, 832, are configured, with the at least one processor, to cause the respective apparatus 700, 800 to carry out any one of the embodiments of FIGS. 1 to 6, or operations thereof.

In an embodiment, these operations may comprise tasks, such as, preparing a data packet for transmission on a bearer, wherein at least one of the following is configured for transmission: a first network node and a second network node, checking whether at least one predetermined criterion is met, selecting, based at least partly on the said checking, whether to transmit the data packet via the first network node, via the second network node, or via both the first and the second network nodes, and transmitting the data packet according to the selecting.

In an embodiment, these operations may comprise tasks, such as, transmitting, by a network access node, an indication to at least one terminal device, wherein the indication causes the at least one terminal device to apply at least one predetermined criterion for selecting whether to transmit at least one data packet via a first network node, via a second network node, or via both the first and the second network nodes.

Referring to FIG. 7, the memory 730 may be implemented using any suitable data storage technology, such as semiconductor based memory devices, flash memory, magnetic memory devices and systems, optical memory devices and systems, fixed memory and removable memory. The memory 730 may comprise a database 734 for storing data, such as the data packet(s) to be transmitted.

The apparatus 700 may further comprise radio interface (TRX) 720 comprising hardware and/or software for realizing communication connectivity according to one or more communication protocols. The TRX may provide the apparatus with communication capabilities to access the radio access network and enable communication between network nodes, for example. The TRX may provide the apparatus 700 connection to the above-mentioned X2 interface 120 and/or the Iub. The TRX may comprise standard well-known components such as an amplifier, filter, frequency-converter, (de)modulator, and encoder/decoder circuitries and one or more antennas.

The apparatus 700 may also comprise user interface 740 comprising, for example, at least one keypad, a microphone, a touch display, a display, a speaker, etc. The user interface 740 may be used to control the respective apparatus by a user of the apparatus 700.

In an embodiment, the apparatus 700 may be or be comprised in a base station (also called a base transceiver station, a Node B, a radio network controller, or an evolved Node B, for example). The apparatus 700 may be the network element 102, for example. In an embodiment, the apparatus 700 is the first network node of FIG. 2. In an embodiment, the apparatus 700 is and/or is comprised in a terminal device, such as the at least one terminal device 110.

The control circuitry 710 may comprise a data packet preparer circuitry 712 configured to prepare a data packet for transmission on a bearer, wherein at least one of the following is configured for transmission: a first network node and a second network node. The control circuitry 710 may further comprise a criterion checker circuitry 714 configured to check whether at least one predetermined criterion is met. Based at least partly on the said checking by the criterion checker circuitry 714, a transmission selector circuitry 716 may select whether to transmit the data packet via the first network node, via the second network node, or via both the first and the second network nodes. A data packet transmitter circuitry 718 may transmit the data packet according to the selecting using the radio interface 720. The transmission selector circuitry 716 and the data packet transmitter circuitry 718 may be comprised in the control circuitry 710.

Referring to FIG. 8, the memory 830 may be implemented using any suitable data storage technology, such as semiconductor based memory devices, flash memory, magnetic memory devices and systems, optical memory devices and systems, fixed memory and removable memory. The memory 830 may comprise a database 834 for storing data.

The apparatus 800 may further comprise radio interface (TRX) 820 comprising hardware and/or software for realizing communication connectivity according to one or more communication protocols. The TRX may provide the apparatus with communication capabilities to access the radio access network and enable communication between network nodes, for example. The TRX may provide the apparatus 800 connection to the above-mentioned X2 interface 120, for example. The TRX may comprise standard well-known components such as an amplifier, filter, frequency-converter, (de)modulator, and encoder/decoder circuitries and one or more antennas.

The apparatus 800 may also comprise user interface 840 comprising, for example, at least one keypad, a microphone, a touch display, a display, a speaker, etc. The user interface 840 may be used to control the respective apparatus by a user of the apparatus 800.

In an embodiment, the apparatus 800 may be or be comprised in a base station (also called a base transceiver station, a Node B, a radio network controller, or an evolved Node B, for example). The apparatus 800 may be the network element 102, for example.

The control circuitry 810 may comprise an indication transmitter circuitry 812 configured to transmit an indication to at least one terminal device, such as the at least one terminal device 110, wherein the indication causes the at least one terminal device to apply at least one predetermined criterion for selecting whether to transmit at least one data packet via a first network node, via a second network node, or via both the first and the second network nodes.

Figure 9:
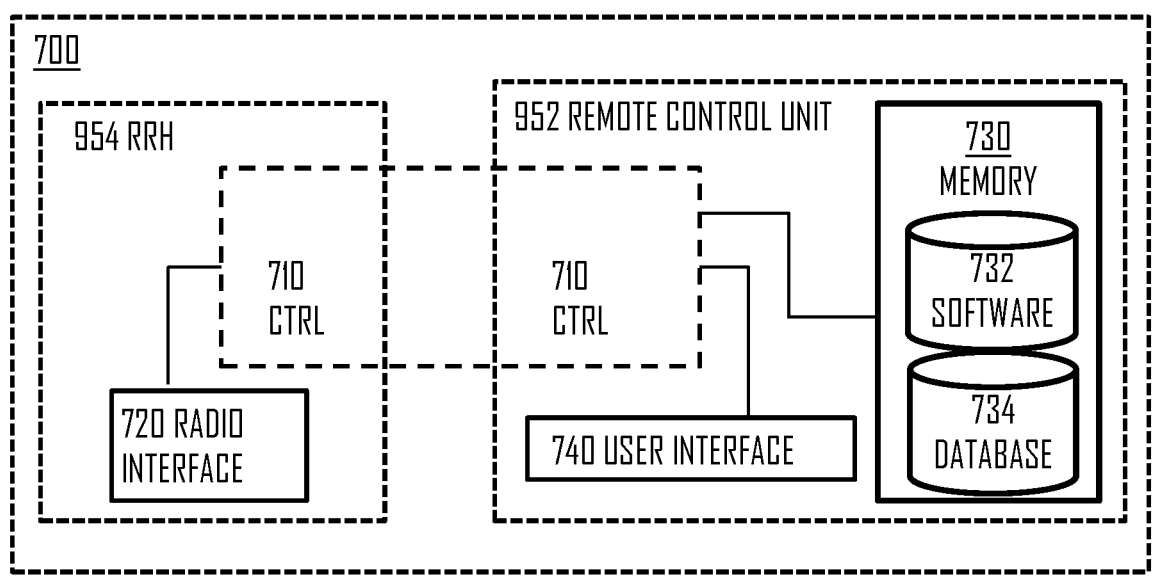
FIG. 9 illustrates an embodiment of the invention.

In an embodiment, as shown in FIG. 9, at least some of the functionalities of the apparatus 700 may be shared between two physically separate devices, forming one operational entity. Therefore, the apparatus 700 may be seen to depict the operational entity comprising one or more physically separate devices for executing at least some of the described processes. Thus, the apparatus 700 of FIG. 9, utilizing such shared architecture, may comprise a remote control unit (RCU) 952, such as a host computer or a server computer, operatively coupled (e.g. via a wireless or wired network) to a remote radio head (RRH) 954 located in the base station. In an embodiment, at least some of the described processes may be performed by the RCU 952. In an embodiment, the execution of at least some of the described processes may be shared among the RRH 954 and the RCU 952. Although FIG. 9 illustrates only the shared functionalities of the apparatus 700, similar shared architecture may be used also with the apparatus 800 of FIG. 8.

In an embodiment, the RCU 952 may generate a virtual network through which the RCU 952 communicates with the RRH 954. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6 or operations thereof. In an embodiment, these operations may comprise tasks, such as, preparing a data packet for transmission on a bearer, wherein at least one of the following is configured for transmission: a first network node and a second network node, checking whether at least one predetermined criterion is met, selecting, based at least partly on the said checking, whether to transmit the data packet via the first network node, via the second network node, or via both the first and the second network nodes, and transmitting the data packet according to the selecting. In an embodiment, these operations may comprise tasks, such as, transmitting, by a network access node, an indication to at least one terminal device, wherein the indication causes the at least one terminal device to apply at least one predetermined criterion for selecting whether to transmit at least one data packet via a first network node, via a second network node, or via both the first and the second network nodes.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6, or operations thereof. In an embodiment, these operations may comprise tasks, such as, preparing a data packet for transmission on a bearer, wherein at least one of the following is configured for transmission: a first network node and a second network node, checking whether at least one predetermined criterion is met, selecting, based at least partly on the said checking, whether to transmit the data packet via the first network node, via the second network node, or via both the first and the second network nodes, and transmitting the data packet according to the selecting. In an embodiment, these operations may comprise tasks, such as, transmitting, by a network access node, an indication to at least one terminal device, wherein the indication causes the at least one terminal device to apply at least one predetermined criterion for selecting whether to transmit at least one data packet via a first network node, via a second network node, or via both the first and the second network nodes.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor and at least one memory including a computer program code, wherein the at least one memory and the computer program code are configured, with the at least one processor, to cause the apparatus to:
   prepare a data packet for transmission on a bearer;
   check whether at least one predetermined criterion is met;
   select, based at least partly on the said checking, whether to transmit the data packet via a first network node, via a second network node, or via both the first and the second network nodes; and
   transmit the data packet according to the selecting;
   wherein the at least one predetermined criterion is related to whether or not a timer is running such that the data packet is transmitted via both the first and the second network nodes when the timer is running.

2. The apparatus of claim 1, wherein the data packet is a first data packet, and wherein the at least one memory and the computer program code are configured, with the at least one processor, to cause the apparatus further to:
   prepare a second data packet for transmission;
   select whether to transmit the data packets via the first network node, via the second network node, or via both the first and the second network nodes; and
   transmit the data packets according to the selecting.

3. The apparatus of claim 2, wherein the selecting comprises selecting to transmit the first and the second data packets via different network nodes.

4. The apparatus of claim 2, wherein the selecting comprises selecting to transmit at least one of the first and the second data packets via both the first and the second network nodes.

5. The apparatus of claim 2, wherein the at least one predetermined criterion is related to size of at least one of the following: the first data packet and the second data packet such that a data packet smaller than a predetermined size threshold is transmitted via both the first and the second network nodes.

6. The apparatus of claim 2, wherein the at least one predetermined criterion is related to priority of at least one of the following: the first data packet and the second data packet such that a data packet having a priority over a certain level is transmitted via both the first and the second network nodes.

7. The apparatus of claim 1, wherein the at least one predetermined criterion is related to at least one of the following: amount of data in a transmission data buffer, load in the first network node and load in the second network node such that a data packet is transmitted via both the first and the second network nodes when the load in the first network node and/or in the second network node is low, and/or when the amount of data in the transmission data buffer is small.

8. The apparatus of claim 1, wherein the at least one predetermined criterion is related to transmission delay via the second network node such that the data packet is transmitted only via the transmission path that is characterized by a lower latency or transmission delay.

9. The apparatus of claim 8, wherein the at least one memory and the computer program code are configured, with the at least one processor, to cause the apparatus further to:
receive, from the second network node, status report indicating the sequence number of a data packet that has been successfully transmitted via the second network node; and
based on the status report, determine the transmission delay via the second network node.

10. The apparatus of claim 1, wherein the apparatus is configured to prepare, check, select and transmit during a slow-start phase of Transmission Control Protocol traffic.

11. The apparatus of claim 1, wherein the at least one memory and the computer program code are configured, with the at least one processor, to cause the apparatus further to:
transmit the first data packet via the first network node or via the second network node in a direction of transmission as either uplink or downlink;
prepare a third data packet for transmission in the direction of transmission that is same as the first data packet;
select, based on that the third data packet is smaller than a predefined threshold, to transmit the third data packet via both the first and the second network nodes; and
transmit the third data packet in the direction of transmission and via both the first and second network nodes.

12. The apparatus of claim 1, wherein the apparatus is or is comprised in a base station, and wherein the at least one memory and the computer program code are configured, with the at least one processor, to cause the base station further to:
transmit an indication, allowing to apply the at least one predetermined criterion, to at least one terminal device.

13. The apparatus of claim 1, wherein the first network node is a master network node and the second network node is a secondary network node of a radio communication network, and wherein the data is transmitted to the at least one terminal device.

14. The apparatus of claim 1, wherein the apparatus is or is comprised in a terminal device.

15. The apparatus of claim 14, wherein the at least one memory and the computer program code are configured, with the at least one processor, to cause the terminal device further to:
receive a first request to transmit the data packet to the first network node, to the second network node or to both the first and the second network nodes;
transmit the data packet according to the first request.

16. The apparatus of claim 14, wherein the at least one memory and the computer program code are configured, with the at least one processor, to cause the terminal device further to:
receive, from a network, an indication allowing to apply the at least one predetermined criterion.

17. The apparatus of claim 1, wherein the timer is triggered to start at one of the following: when a slow-start phase of Transmission Control Protocol traffic is started, when a Buffer Status Report (BSR) is triggered, or when high priority data becomes available.

18. An apparatus comprising at least one processor and at least one memory including a computer program code, wherein the at least one memory and the computer program code are configured, with the at least one processor, to cause a network access node to:
transmit an indication to at least one terminal device, wherein the indication causes the at least one terminal device to apply at least one predetermined criterion for selecting whether to transmit at least one data packet via both the first and the second network nodes, wherein the at least one predetermined criterion comprises determining whether a timer is running, wherein the terminal device is caused to transmit the data packet via both the first and the second network nodes when the timer is running.

19. An apparatus comprising at least one processor and at least one memory including a computer program code, wherein the at least one memory and the computer program code are configured, with the at least one processor, to cause the apparatus to:
prepare a data packet for transmission on a bearer;
check whether at least one predetermined criterion is met;
select, based at least partly on the said checking, whether to transmit the data packet via a first network node, via a second network node, or via both the first and the second network nodes; and
transmit the data packet according to the selecting;
wherein the at least one predetermined criterion is related to buffer status of the apparatus such that the data packet is transmitted via both the first and the second network nodes when the amount of data in the buffer is below a predetermined threshold.

* * * * *